US009656409B2

(12) United States Patent
Thierry et al.

(10) Patent No.: US 9,656,409 B2
(45) Date of Patent: May 23, 2017

(54) METHOD FOR PREPARING POLYAMIDE GRANULES

(71) Applicant: RHODIA OPERATIONS, Aubervilliers (FR)

(72) Inventors: Jean-Francois Thierry, Francheville (FR); Phlippe Boulanger, Vernaison (FR)

(73) Assignee: Rhodia Operations, Paris (FR)

( * ) Notice: Subject to any disclaimer, the term of this patent is extended or adjusted under 35 U.S.C. 154(b) by 412 days.

(21) Appl. No.: 14/354,219

(22) PCT Filed: Oct. 24, 2012

(86) PCT No.: PCT/EP2012/071005
§ 371 (c)(1),
(2) Date: Apr. 25, 2014

(87) PCT Pub. No.: WO2013/060699
PCT Pub. Date: May 2, 2013

(65) Prior Publication Data

US 2014/0327171 A1 Nov. 6, 2014

(30) Foreign Application Priority Data

Oct. 25, 2011 (FR) ..................................... 11 59637

(51) Int. Cl.
*B29C 47/12* (2006.01)
*B29B 9/06* (2006.01)
*B29B 9/16* (2006.01)

(52) U.S. Cl.
CPC ................. *B29B 9/06* (2013.01); *B29B 9/16* (2013.01); *B29B 9/065* (2013.01)

(58) Field of Classification Search
CPC .................................. B29B 9/06; B29B 9/16
See application file for complete search history.

(56) References Cited

U.S. PATENT DOCUMENTS

| | | | |
|---|---|---|---|
| 2,289,774 A | 7/1942 | Graves | |
| 2,863,857 A | 12/1958 | Costain et al. | |
| 3,193,535 A | 7/1965 | Carter | |
| 3,258,313 A | 6/1966 | Griffiths | |
| 3,277,519 A | 10/1966 | Jones | |
| 3,549,601 A | 12/1970 | Fowell | |
| 4,213,884 A | 7/1980 | Eckell et al. | |
| 4,442,260 A | 4/1984 | Larsen | |
| 5,052,123 A | 10/1991 | Tischendorf et al. | |
| 5,059,103 A | 10/1991 | Bruckmann et al. | |
| 5,090,134 A | 2/1992 | Riissemeyer et al. | |
| 5,306,804 A | 4/1994 | Liehr et al. | |
| 5,310,515 A | 5/1994 | Jurgen et al. | |
| 5,346,984 A | 9/1994 | Hasegawa et al. | |
| 5,432,254 A | 7/1995 | Liehr et al. | |
| 5,959,069 A | 9/1999 | Gluck et al. | |
| 6,060,580 A | 5/2000 | Nijenhuis et al. | |
| 6,107,449 A | 8/2000 | Wiltzer et al. | |
| 6,316,588 B1 | 11/2001 | Mohrschladt et al. | |
| 6,428,298 B1 | 8/2002 | Clauss et al. | |
| 6,592,350 B1 | 7/2003 | Chszaniecki | |
| 2004/0236063 A1* | 11/2004 | Suzuki | C08J 3/12 528/275 |
| 2005/0004341 A1* | 1/2005 | Culbert | B29B 9/16 528/308.3 |
| 2005/0209436 A1 | 9/2005 | Wilzer | |
| 2007/0135613 A1 | 6/2007 | Christel et al. | |
| 2007/0265429 A1* | 11/2007 | Hudson | B29B 9/16 528/503 |
| 2009/0264588 A1 | 10/2009 | Guaita et al. | |
| 2010/0144986 A1 | 6/2010 | Thierry et al. | |
| 2010/0168375 A1 | 7/2010 | Thierry | |
| 2010/0267922 A1* | 10/2010 | Culbert | B29B 9/16 528/308.2 |
| 2011/0130513 A1* | 6/2011 | Chiang | B29B 9/065 524/599 |
| 2011/0275760 A1 | 11/2011 | Trouillet-Fonti et al. | |
| 2012/0046438 A1 | 2/2012 | Thieblemont et al. | |
| 2012/0256341 A1 | 10/2012 | Gloeckner | |
| 2013/0184413 A1 | 7/2013 | Di Martino et al. | |
| 2014/0327171 A1 | 11/2014 | Thierry et al. | |

FOREIGN PATENT DOCUMENTS

| | | | |
|---|---|---|---|
| CN | 101016411 | A | 8/2007 |
| DE | 19804023 | A1 | 8/1999 |
| DE | 102008062480 | A1 | 6/2010 |
| EP | 0672703 | A1 | 9/1995 |
| FR | 1352650 | A | 2/1964 |
| FR | 1505307 | A | 12/1967 |
| FR | 1520190 | A | 4/1968 |
| FR | 2791296 | B1 | 3/2000 |
| FR | 2916756 | B1 | 7/2009 |
| FR | 2981600 | B1 | 11/2013 |
| GB | 749479 | A | 5/1956 |
| GB | 1159151 | A | 7/1969 |
| JP | S50-119097 | A | 9/1975 |
| JP | S51-46350 | A | 4/1976 |
| JP | S60-4011 | A | 1/1985 |
| JP | S61-162305 | A | 7/1986 |
| WO | WO 9635739 | A1 | 11/1996 |
| WO | WO 9839095 | A1 | 9/1998 |
| WO | WO 2006127698 | A1 | 11/2006 |
| WO | WO 2007113262 | A1 | 10/2007 |
| WO | WO 2008125429 | A1 | 10/2008 |
| WO | WO 2009040436 | A1 | 4/2009 |

(Continued)

OTHER PUBLICATIONS

Rieter, Pellet dryer aero, external documentation; 2001 Copyright by Rieter-Automatik; Germany ZeitZeichen (4 pages).

(Continued)

*Primary Examiner* — Galen Hauth
(74) *Attorney, Agent, or Firm* — Osha Liang LLP

(57) ABSTRACT

The present invention relates to a method for preparing polyamide granules. This method comprises, in particular, steps of extruding the polymer, cooling and cutting the extruded material, and a step of cooling the granules. The method of the invention is simple and quick to implement.

15 Claims, No Drawings

(56) References Cited

FOREIGN PATENT DOCUMENTS

| | | | |
|---|---|---|---|
| WO | WO 2010105939 | A1 | 9/2010 |
| WO | WO 2011134883 | A2 | 11/2011 |

OTHER PUBLICATIONS

Rieter, Underwater Strand Pelletizing, internet documentation, 2008 (6 pages).
Kristofic, Thermal properties of poly-$\epsilon$-caprolactam and copolyamides based on $\epsilon$-caprolactam; Journal of Thermal Analysis and Calorim 2009, vol. 98, p. 145-140, 27 (6 pages).

* cited by examiner

METHOD FOR PREPARING POLYAMIDE GRANULES

RELATED APPLICATIONS

This application is a U.S. national stage entry under 35 U.S.C. §371 of International Application No. PCT/EP2012/071005, filed Oct. 24, 2012, which claims priority to French Application No. 11 59637 filed on Oct. 25, 2011. The entire contents of these applications are explicitly incorporated herein by this reference.

The present invention relates to a process for the preparation of polyamide granules. This process comprises in particular stages of extrusion of the polymer, of cooling with a water-comprising liquid, of cutting the extruded material and also a stage of cooling the granules. The process of the invention is simple and rapid to carry out.

Polyamides are polymers of great industrial and commercial interest. Thermoplastic polyamides are obtained either by reaction between two different monomers or by polycondensation of just one monomer. The invention applies, first, to polyamides resulting from two different monomers, the most important polyamide of which is poly(hexamethylene adipamide). The invention applies, secondly, to polyamides resulting from just one monomer, the most important polyamide of which is polycaprolactam.

The manufacture of polymers of polyamide type is mainly carried out by polycondensation starting from the monomers, generally by heating an aqueous solution of the monomers at high temperature and high pressure.

The polyamides thus manufactured, mainly in the molten form, are subsequently generally put into the form of granules.

These granules are subsequently used in a large number of applications, in particular for the manufacture of yarns, fibers or filaments, or for the shaping of articles by molding, injection molding or extrusion molding. They can in particular be used in the field of industrial plastics, generally after a formulation stage.

These granules have to exhibit a relatively low water content, which varies according to the applications and the characteristics of the polyamide (molecular weight, and the like). This is because an excessively large amount of water present in the polyamide can bring about, for example during remelting, a decrease in the molecular weight. This fall in molecular weight can result in a deterioration in the mechanical properties of the final polyamide-based articles, in a deterioration in their properties of use, such as the surface appearance, or in a deterioration in the performance of the conversion processes, such as spinning (breakages, and the like).

In point of fact, polyamide granules are mainly obtained by extrusion of the polyamide in the molten state, cooling and cutting the extruded material into the form of granules, generally using water as cooling means. A subsequent stage of drying the granules is thus often necessary in order to obtain granules having a low water content.

This drying stage is generally carried out in dryers, such as drying towers, hoppers or rotary dryers, over several hours, at high temperature, generally greater than 80° C. These conditions often require carrying out the drying and the packaging in an oxygen-free environment, using an inert gas, in order to prevent the well-known phenomenon of yellowing of the granules related to the oxidation of the polyamide by atmospheric oxygen. This gas is preferably predried. These difficult and restrictive drying conditions represent a not insignificant cost in the manufacture of the polyamide.

Furthermore, a search is also underway, when a polyamide is obtained in the molten state which already exhibits a relatively low water content, to keep this water content low during the preparation of the granules from this polyamide, in order to obtain a final polyamide granule having a low water content.

To this end, and in order to overcome the abovementioned disadvantages, the invention provides a process for the preparation of polyamide granules comprising the following stages:

a) extruding the polyamide in the molten state,
b) cooling the material obtained using a water-comprising cooling liquid,
c) cutting the material into the form of granules,
d) separating the cooling liquid and the material,
e) cooling the granules separated from the cooling liquid until a mean temperature of the granules of less than or equal to 55° C. is achieved, the cutting stage c) being carried out during stage b), after stage b) and before the separation stage d), or after the separation stage d), the duration of the contact between the extruded material and the cooling liquid being less than or equal to 10 seconds, and the duration of stage e) being less than or equal to 10 minutes.

This process is simple and rapid and requires neither heating of the granules nor drying in an inert environment. It is thus economical, makes possible a low energy expenditure and gives access to a polyamide having a quality compatible with its applications.

Thus, advantageously, the process for the preparation of polyamide granules according to the invention does not comprise a stage of drying the polyamide granules in an inert gas environment. Advantageously, the process for the preparation of polyamide granules according to the invention does not comprise a stage of heating the polyamide granules. Preferably, the process for the preparation of polyamide granules according to the invention comprises neither a stage of drying the polyamide granules in an inert environment nor a stage of heating the polyamide granules.

The granules obtained by the process of the invention can be of different forms. They can, for example, be in the cylindrical, spherical or elliptical form, and the like.

The polyamide of the invention can be a mixture or an alloy of polyamides, or a copolyamide.

Preferably, the polyamide is chosen from polyamide 6, polyamide 11, polyamide 12, polyamide 4.6, polyamide 5.6, polyamide 6.6, polyamide 6.10, polyamide 6.12, polyamide 9.T polyamide 10.T and their copolymers. They can also be copolymers comprising units resulting from the use of diacid monomers of the isophthalic or terephthalic acid type, or else of diamine monomers of the meta-xylylenediamine or para-xylylenediamine type. Mention will be made, for example, of the 4.T, 6.T, 6.I, MXD.6 and PXD.6 units and the like.

According to a particularly advantageous form of the invention, polyamide 6.6 is preferred.

The polyamide can be in the form of a composition based on the polyamide as matrix and comprising additives, such as surfactants, nucleating agents, such as talc, plasticizers and the like. These additives are known to a person skilled in the art.

The composition can also comprise other compounds, such as reinforcing fillers, for example glass fibers, mattifying agents, such as titanium dioxide or zinc sulfide, pigments, dyes, heat or light stabilizers, bioactive agents, soil-release agents, antistatic agents, flame retardants, and the like. This list is not in any way exhaustive.

Stage a)

Stage a), which consists in extruding the polyamide in the molten state, is carried out conventionally, in particular through a die. This method is known to a person skilled in the art.

The die is generally placed at the outlet of a polymerization reactor, or at the outlet of a transfer line fed with molten polyamide using a pump, or at the outlet of a kneading device which can generate a pressure greater than atmospheric pressure, generally an extruder.

At the die outlet, a material is obtained generally in the form of rods or strips, or directly in the form of granules in the case, for example, of underwater pelletizing, as explained later in the description.

The extrusion flow rate of the polyamide is generally between 500 and 15 000 kg/h.

Stage b)

Stage b) consists in cooling the material obtained after extrusion, by contact with a water-comprising liquid.

The cooling of the material makes it possible in particular to at least superficially solidify the latter.

The water-comprising cooling liquid is not (or only very slightly) a solvent for the polymer. It can, for example, comprise an alcohol, such as ethanol, isopropanol or butanol.

The cooling liquid can also comprise additives, such as bactericides, scale inhibitors, and the like.

The cooling liquid, preferably water, is at a temperature, during stage b), advantageously of between 5 and 95° C., preferably of between 10 and 80° C.

The cooling devices suitable for such a stage are known to a person skilled in the art.

This cooling device can consist of a water-spraying device located in the proximity of the device of the die plate. It can also be a bath or a stream of water located in the proximity of or in contact with the device of the die plate into which the extruded material is introduced. A water-trickling device can also be employed.

Stages c) and d)

According to a specific embodiment of the process of the invention, the material thus cooled is subsequently cut into the form of granules according to stage c) of the process of the invention and before the stage d) of separation of the cooling liquid and material. This cutting stage can also occur during the cooling stage b) or after the stage d) of separation of the cooling liquid and material.

The cutting devices suitable for this stage c) are known to a person skilled in the art. The cutting device can be a milling cutter system with teeth; it can also be a system comprising knives and a knife block. The device generally comprises a motor for driving the milling cutter or the knife block. The cutting device is usually rotary.

The process of the invention thus comprises a stage d) of separation of the cooling liquid and polymeric material. This stage makes it possible to remove most of the cooling liquid.

Mode b/c/d

According to a first specific embodiment of the process of the invention, the cutting stage c) is carried out after stage b) and before the stage d) of separation of the cooling liquid and material. "After stage b)" will be understood as meaning that stage b) has already begun when stage c) is carried out. In this case, the cooling liquid, generally water, is separated from the polyamide material when it is found in the form of granules, that is to say after the cutting stage c). The separation can, for example, be carried out using a centrifuge, which separates the water and the granules, or using a cycloning device, or any other device using centrifugal force. The separation can also be carried out using an air-fed device which provides both the conveying of the granules and the expulsion of the water through screens, for example a device of Aero® type sold by Automatik Plastics Machinery.

It should be pointed out that, in this first mode, the granules are in contact with the cooling liquid up to the end of the stage d) of separation of the cooling liquid and granules. The effective cooling of the granules thus extends from stage b) to stage d) while passing through stage c).

Mode b/d/c

According to a second specific embodiment of the process of the invention, the cutting stage c) is carried out after the stage d) of separation of the cooling liquid and material.

In this case, the cooling liquid, generally water, is separated from the polymer rods or strips and then the rods or strips are "dry" cut. The separation can be carried out, for example, by departure of the rods or strips from the bath via an entrainment device. The cooling liquid can be removed by using gravity or by sucking the liquid through a screen or any other openwork device over which the rods or strips move. These devices are known to a person skilled in the art.

It should be pointed out that, in this second mode, the polyamide material is in contact with the cooling liquid up to the end of the stage d) of separation of the cooling liquid and material. The effective cooling of the material thus takes place during stages b) and d).

Mode b+c/d

According to a third specific embodiment of the process of the invention, stages b) and c) start simultaneously.

According to this embodiment, stages b) and c) are advantageously carried out using a cutting device positioned immediately at the outlet of the die. Such a granulation device is known to a person skilled in the art. It comprises at least one cutting device which faces the die plate through which the polymer is extruded, and a cooling device. The cutting device generally comprises knives, a knife block and a motor for driving the knife block. The knife block is usually rotary. The cooling device can consist of a device for the spraying or circulation of cooling liquid located in the proximity of the device of the die plate. This is the case with "pelletizing" granulators known to a person skilled in the art. The cutting device and the die plate can also be positioned in a chamber filled with cooling liquid; in this case, it is an "underwater pelletizing" granulator. In this chamber filled with cooling liquid, the cooling liquid is generally in circulation and it provides the cooling and the transportation of the polyamide granules formed at the cutting device toward a separator, where stage d) is carried out. The separation can be carried out using a centrifuge which separates the cooling liquid and the granules or, for example, using a cycloning device. Such "underwater pelletizing" granulating devices are, for example, described in U.S. Pat. No. 5,059,103.

According to another specific embodiment of the process of the invention, stages b) to d) of the process are carried out on a granulation platform, which generally comprises a device for guiding and cooling the extruded material, a cutting device and a device for transferring toward a separation device. These granulation platforms are known to a person skilled in the art. The guiding device can be horizontal, vertical or inclined by an angle ranging from 0 to 90° with respect to the horizontal.

The duration of the contact between the polymeric material and the cooling liquid, according to the process of the invention, is less than 10 seconds, preferably less than 8 seconds and advantageously less than or equal to 6 seconds. This duration of contact between the polymeric material and the cooling liquid is sufficient to at least superficially solidify the material and is optimized in order to minimize the amount of water absorbed at the surface of the material, while making it possible to achieve a temperature before stage e) such that the elimination by evaporation of the water present at the surface of the granule is facilitated.

"Duration of the contact between the material and the cooling liquid" will be understood as meaning the sum of the contact times between polymeric material and cooling liquid corresponding to each of the stages during which the material and the cooling liquid are in contact. In other words, this duration includes stage b) and stage d) and, if appropriate, stage c), when the latter is carried out during stage b) or between stage b) and stage d).

These contact times are equivalent to the residence times of the polymeric material in each of the stages and can be easily measured by techniques known to a person skilled in the art or calculated from the volume flow rates of material and cooling liquid and from the geometry of the various pipes, channels, and the like, in which the flows are carried out.

Stage e)

The process of the invention comprises a stage e) of cooling the granules separated from the cooling liquid until a mean temperature of the granules of less than or equal to 55° C., preferably of less than or equal to 45° C., is achieved.

"Mean temperature of the granules" is understood to mean the temperature achieved by the granules when they are placed in a thermally insulated container for a certain uniformization time. For example, in practice, a sample of granules is introduced into a thermally insulated container of Dewar type and the temperature within the bed of granules is measured after a uniformization time of a few minutes. Reference may be made to the examples of the invention for further details with regard to this measurement method.

The mean temperature of the granules before stage e) is advantageously between 60 and 150° C., preferably between 70 and 130° C. and more preferably still between 70 and 120° C. According to the process of the invention, the granules are thus preferably at a relatively high temperature before stage e), which promotes the elimination by evaporation of the water present at the surface of the granule. This is because, below 60° C., the granules do not possess sufficient internal thermal energy to be able to correctly eliminate the surface water. Above 150° C., thermo-oxidative decomposition reactions are very rapid, thus bringing about a risk of excessively great yellowing.

Any device for cooling a solid material can be employed in the context of the invention, provided that it provides sufficiently rapid cooling (in 10 minutes or less) of the granules down to a mean temperature of the granules of less than or equal to 55° C. and that this cooling device does not bring the polyamide material into contact with a water-comprising liquid phase.

It is important for stage e) to make it possible to cool at least down to a mean temperature of the granules of less than 55° C. as, if the granules are recovered at a higher temperature, then the risk of yellowing during the subsequent operations of storage and transportation is considerably increased.

It is also necessary for the cooling to be rapid (in 10 minutes or less) in order to prevent excessively great yellowing during the subsequent cooling and storage and also in order to limit the reabsorption of moisture when the granules are brought into contact with a non-dried gas (ambient air, for example).

Cooling with a Gas

According to a first embodiment of stage e) of the process, said stage e) is carried out by treatment of the granules with a gas at a temperature of between 0 and 40° C.

Any device for the treatment of a solid material with a gas known to a person skilled in the art can be employed in carrying out the treatment of stage e). It can be a device for projecting gas onto a solid. Generally, agitation of the granules is carried out: it can either be brought about by the gas itself or be generated using an agitation device. This agitation makes possible good effectiveness and good homogeneity of the cooling of the granules.

The gas for the treatment of stage e) is advantageously air, in particular ambient air. "Ambient air" is understood to mean, within the meaning of the invention, that the air has not been subjected to any heating or cooling treatment nor to any drying or treatment for freeing it from the oxygen present therein. This also represents an advantage of the process of the invention. This is because it is known that the polyamide yellows when it is subjected to high temperatures for a prolonged period, which is problematic. Thus, in the drying processes of the prior art, which employ high temperatures and long durations, the drying is generally carried out in an oxygen-free atmosphere, using an inert gas, in order to prevent this problem of yellowing. In point of fact, in the process of the invention, the cooling of stage e) is rapid and carried out at low temperatures; it is therefore not necessary to carry out the cooling in an inert atmosphere, which greatly simplifies the process. Furthermore, contrary to the processes of the prior art, the gas does not need to be conditioned: for example, it does not have to be dried, cooled, reheated or freed from the oxygen present therein.

Thus, one of the advantages of the process of the invention is that this stage e) requires no or little heating, in contrast to the processes of the prior art.

According to a first embodiment of stage e) by treatment with a gas, this stage is carried out in a fluidized bed or an ebullating bed, preferably a fluidized bed. These devices are known to a person skilled in the art.

According to another embodiment of stage e) by treatment with a gas, stage e) is carried out using a conveyor equipped with a system for direct cooling by injection of air. It can be a vibrating helical conveyor, that is to say a vibrating conveyor comprising at least one turn forming a helical channel and a means for cooling by direct injection of air onto the granules. This type of vibrating conveyor is known to a person skilled in the art.

Other embodiments of stage e) by treatment with a gas can be envisaged. A person skilled in the art will easily be able to find equivalent means which can be used for the implementation of this stage.

Cooling by Contact with a Cooled Surface

According to a second embodiment of stage e) of the process, said stage e) is carried out by bringing the granules into contact with a surface, the temperature of which is between 5 and 35° C.

In this second embodiment, the moisture which exits from the granules to go into the gas phase is advantageously eliminated, for example by natural convection; in other words, the atmosphere above the granules is advantageously an "open" atmosphere and not a "closed" atmosphere, that is to say an open-air cooler, for example.

According to this embodiment, stage e) is carried out using a conveyor, for example a vibrating helical conveyor, equipped with a system for indirect cooling by a jacket in which a cooling fluid circulates at a temperature of between 5 and 35° C.

In the specific case where the device for cooling the granules is a vibrating helical conveyor, that is to say a vibrating conveyor comprising at least one turn forming a helical channel, a portion at least of the metal wall of this channel in contact with the granules is a wall equipped with a jacket in which a cooling fluid circulates at a temperature of between 5 and 35° C. This type of conveyor is known to a person skilled in the art.

Other types of conveyors can be used for bringing the granules into contact with a surface, the temperature of which is between 5 and 35° C. Mention may be made, for example, of screw conveyors. The geometry of the conveyor can vary within a wide range, the vibrating helical conveyor being preferred.

The duration of the cooling stage e) is less than 10 minutes, preferably less than 5 minutes. This represents another advantage of the process of the invention, which employs a very short cooling stage, of the order of a few tens of seconds, in contrast to the processes of the prior art, which require a drying operation often of several hours. In the mode described above, where cooling is carried out using a fluidized bed, the duration of stage e) is even advantageously less than 2 minutes.

The process of the invention comprises several devices: extrusion, cooling, cutting, separation and other devices. Means for guiding and transporting the extruded material and granules, within and between these various devices, can be employed. They are means known to a person skilled in the art. For example, conveyor belts, guides for rods/strips, with or without grooves, can be employed. The granules can be transported using a liquid, such as water, and the like.

It is, of course, possible to carry out additional treatments of the granules downstream of the cooler, such as, for example, operations of sieving, mixing, surface-coating treatment, and the like.

The process of the invention can be continuous or batchwise.

After stage e), the granules advantageously exhibit a moisture content of between 0.1% and 0.4% by weight of water (with respect to the weight of granules). It is the combination of the stages of the process of the invention which makes it possible to obtain the abovementioned moisture characteristics and thus in particular to supply polyamide granules suitable for the manufacture of formulations intended for injection/molding in a simple and rapid way, by employing very mild conditions which limit the risk of decomposition of the polyamide (no yellowing and preservation of the mechanical properties).

This is why the present invention is also targeted at the use of the process of the invention for the preparation of granules having a moisture content of between 0.1% and 0.4% by weight of water (with respect to the weight of granules). Advantageously, said use is particularly suitable for the preparation of polyamide granules having a mean weight of granules of between 1.0 and 5.0 g per 100 granules, preferably between 1.5 and 4.0 g per 100 granules.

The granules thus obtained can subsequently be stored or transported in order to be used in a large number of applications, in particular for the manufacture of yarns, fibers or filaments, or for the shaping of articles by molding, injection molding or extrusion molding. They can in particular be used in the field of industrial plastics. In these applications, they are generally melted and then shaped.

Other details or advantages of the invention will become more clearly apparent in the light of the examples given below.

EXAMPLES

Description of the Characterization Methods

Measurement of the Temperature of the Granules

A thermally insulated container of Dewar type, having a volume of 500 ml, is filled with the granules, the mean temperature of which it is desired to measure. A temperature probe of thermocouple type is subsequently introduced into the heart of the bed of granules. The temperature is read after a uniformization time of 3 minutes. The Dewar container is emptied and the measurement procedure is immediately repeated. The result selected is that of the second measurement.

Moisture Content

The water concentration of the granules is measured by Karl Fischer titration, by means of an oven of Metrohm KF 768 or equivalent type and of a coulometer of Metrohm KF 756 or equivalent type, according to the standard ISO 15512, $2^{nd}$ edition (2008 May 15).

Viscosity Index

The viscosity index of polyamide 6.6 is measured at a concentration of 0.005 $g \cdot ml^{-1}$, in solution in 90% by weight formic acid, according to the standard ISO 307. The result is expressed in $ml \cdot g^{-1}$.

Mean Weight of Granules

The mean weight of granules is determined by simple weighing of 100 granules, using a precision balance. The result is expressed in grams per 100 granules, rounded to the nearest multiple of 0.05.

Yellowness Index

The color of the polymer granules is determined by means of a Konica Minolta CR-310 or equivalent chroma meter, by measurement with illuminant C of the trichromatic components Yxy of a bed of granules, from which the yellowness index can be calculated. The maximum acceptable limit corresponds to a value of the yellowness index of +1

Tests

Example 1

Invention

Preparation of Polyamide 6.6

A 52% by weight aqueous solution of N Salt (equimolar mixture of hexamethylenediamine and adipic acid) is charged to an evaporator with 0.39% by weight of a 32.4% by weight aqueous hexamethylenediamine solution, 0.10% by weight of a 75% by weight aqueous acetic acid solution, 0.009% by weight of a 15% by weight aqueous sodium hypophosphite monohydrate solution and 9 ppm of antifoam (silicone composition). The mixture is concentrated in the evaporator down to a concentration of 87% by weight. This concentrated solution is then transferred into an autoclave. The autoclave is heated, so as to obtain an autogenous pressure of 1.85 MPa, and then under a pressure maintained at 1.85 MPa, water in the vapor form being continually discharged from the reaction medium by means of a regulating valve. When the temperature of the reaction medium reaches 245° C., the pressure is gradually reduced down to atmospheric pressure. During this decompression phase, the heating is continued and the bulk temperature continues to rise. The reactor is subsequently maintained at atmospheric pressure for 18 minutes (finishing phase); the temperature reached by the reaction mass at the end of this stage is 276° C. The reactor is subsequently placed under a nitrogen pressure of between 0.40 and 0.45 MPa in order to allow the polymer to be extruded.

Extrusion, Granulation and Cooling of the Polymer

The molten polymer present in the autoclave is extruded in the form of rods through a die comprising 66 holes at the flow rate of 1.3 kg per minute and per rod (stage a)). The molten polymer rods exiting from the die are received by a granulation platform, where the following successive operations are carried out:

- Transporting the rods over a guiding zone covered with a film of water (stage b)); this water is fed at a temperature of 15° C. via a lip located at the zone head and also via several distribution pipes equipped with spray nozzles located above the zone. The length travelled by the rods over the zone is 1.40 m.
- Feeding the partially cooled rods into a cutting block (USG600 type from Automatik Plastics Machinery) comprising a device for entraining the rods, providing a delivery rate for the rods of 180 $m \cdot min^{-1}$, and a device for cutting by means of a milling cutter and a counter-blade. The rods are cut in the cutting device (stage c)) and the resulting granules are entrained by the water.
- Conveying the granules, as a mixture with water, in a pipe having a length equal to 5 m (continuation of stage b)); the passage time of the granules in this pipe is equal to 4 s.
- Separating the granules from the cooling water (stage d)) in an air-fed impact device which makes possible the conveying of the granules along a curvilinear channel at the same time as the elimination of the water through several screens (apparatus of the GT 800/2 type from Automatik Plastics Machinery). The air used for this separation is ambient air withdrawn in the plant, at the temperature of 20° C. and at the flow rate of 7800 $m^3 \cdot h^{-1}$. The residence time of the granules in the separating device is of the order of 1 s.

The total flow rate of cooling water used on the platform is 20 $m^3 \cdot h^{-1}$. The temperature of the water at the platform outlet is 45° C.

The duration of the contact between the extruded material and the cooling liquid (stages b+c+d) is equal to 6 seconds.

The granules exiting from the separator directly feed a cooler of fluidized bed type (stage e)) (sold by Comessa). This cooler comprises a bottom having a width of 0.8 m and a length of 4 m pierced by holes, through which holes ambient air withdrawn outside the plant is injected (flow rate 18 000 $m^3 \cdot h^{-1}$; temperature 20° C.; relative humidity 60%). The residence time of the granules in the cooler is 25 s.

At the cooler outlet, the granules pass over a sieve and are then sent into a storage silo by means of an air conveying device.

During the granulation operation, the temperature and the moisture content of the granules are measured on several samples, withdrawn at the outlet of the separator (which corresponds to the inlet of the cooler) or at the outlet of the cooler. The results obtained are summarized in table 1.

Other characteristics (viscosity index, mean weight of granules and yellowness index) are measured on a mean sample, withdrawn at the cooler outlet. The yellowness index is also measured on a sample representative of the polyamide batch manufactured, withdrawn at the silo outlet after storage for 48 h. The corresponding results are collated in table 2.

Example 2

Invention

Preparation of Polyamide 6.6

A polyamide 6.6 is prepared according to a method identical to that of example 1, apart from the following differences:

- Only the 52% by weight aqueous N Salt solution and the antifoam, at a content of 9 ppm, are charged to the evaporator,
- The duration of the finishing stage at atmospheric pressure is 23 min (instead of 18 minutes),
- After the finishing stage, the reactor is put under a nitrogen pressure of between 0.65 and 0.70 MPa (instead of 0.40-0.45 MPa).

Extrusion, Granulation and Cooling of the Polymer

The polymer is subsequently extruded, granulated and cooled according to a process identical to that of example 1, apart from the difference that the length of the pipe in which the conveying of the granules, as a mixture with water, at the outlet of the cutting block, is carried out is 3 m, instead of 5 m. Thus, the passage time of the granules in this pipe is 3 seconds, instead of 4 seconds.

The duration of the contact between the extruded material and the cooling liquid (stages b+c+d) is equal to 5 seconds.

The temperature and the moisture content of the granules, measured during the granulation operation, are summarized in table 1. The viscosity index, the mean weight of granules and the yellowness index, measured on a mean sample withdrawn at the cooler outlet, are collated in table 2. The yellowness index measured on a sample representative of the polyamide batch manufactured, withdrawn at the silo outlet after storage for 48 h, is also given in table 2.

Example 3

Comparative

Preparation of Polyamide 6.6

A 62% by weight aqueous N Salt solution (equimolar mixture of hexamethylenediamine and adipic acid) is charged to an evaporator with 40 ppm of an aqueous antifoam emulsion (silicone composition comprising 20% of active product). The mixture is concentrated in the evaporator down to a concentration of 85% by weight. This concentrated solution is then transferred into an autoclave. The autoclave is heated, so as to obtain an autogenous pressure of 1.85 MPa, and then under a pressure maintained at 1.85 MPa, water in the vapor form being continually discharged from the reaction medium by means of a regulating valve. When the temperature of the reaction medium reaches 245° C., the pressure is gradually reduced down to atmospheric pressure. During this decompression phase, the heating is continued and the bulk temperature continues to rise. The reactor is subsequently maintained at atmospheric pressure for 19 minutes (finishing phase); the temperature reached by the reaction mass at the end of this stage is 276° C. The reactor is subsequently placed under a nitrogen pressure of between 0.50 and 0.55 MPa in order to allow the polymer to be extruded.

Extrusion, Granulation and Cooling of the Polymer

The molten polymer present in the autoclave is extruded in the form of rods through a die comprising 60 holes at the flow rate of 1.6 kg per minute and per rod. The molten polymer rods exiting from the die are received by a granulation platform, where the following successive operations are carried out:

Transporting the rods over a guiding zone covered with a film of water; this water is fed at a temperature of 17° C. via a lip located at the zone head and also via several distribution pipes equipped with spray nozzles located above the zone. The length travelled by the rods over the zone is 3 m.

Feeding the partially cooled rods into a cutting block (USG600 type from Automatik Plastics Machinery) comprising a device for entraining the rods, providing a delivery rate for the rods of 180 $m \cdot min^{-1}$, and a device for cutting by means of a milling cutter and a counter-blade. The rods are cut in the cutting device and the resulting granules are entrained by the water.

Conveying the granules, as a mixture with water, in a pipe having a length equal to 14 m; the passage time of the granules in this pipe is approximately 11 s.

Separating the granules from the cooling water in an air-fed impact device which makes possible the conveying of the granules along a curvilinear channel at the same time as the elimination of the water through several screens (apparatus of the GT 800/2 type from Automatik Plastics Machinery). The air used is ambient air withdrawn in the plant, at the temperature of 20° C. and at the flow rate of 8000 $m^3 \cdot h^{-1}$. The residence time of the granules in the separating device is of the order of 1 s.

The total flow rate of cooling water used on the platform is 37 $m^3 \cdot h^{-1}$. The temperature of the water at the platform outlet is 35° C.

The granules exiting from the separator are not subjected to any additional cooling treatment.

The duration of the contact between the extruded material and the cooling liquid (stages b+c+d) is equal to 14 seconds.

At the cooler outlet, the granules pass over a sieve and are then sent into a storage silo by means of an air conveying device.

The temperature and the moisture content of the granules, measured during the granulation operation, are summarized in table 1. The viscosity index, the mean weight of granules and the yellowness index, measured on a mean sample withdrawn at the outlet of the separator, are collated in table 2. The yellowness index measured on a sample representative of the polyamide batch manufactured, withdrawn at the silo outlet after storage for 48 h, is also given in table 2.

Example 4

Invention

Preparation of Polyamide 6.6

Polyamide 6.6 is prepared from an aqueous N Salt solution (equimolar mixture of hexamethylenediamine and adipic acid) by a standard continuous process known to a person skilled in the art. This process comprises the following successive stages: concentrating the N Salt solution by evaporation up to a concentration of 75% by weight; amidating under a pressure of 1.85 MPa with continuous elimination of water vapor; reducing in pressure down to a pressure close to atmospheric pressure, accompanied by heating as far as 275° C. and elimination of water vapor; finishing at constant temperature under a pressure close to atmospheric pressure. During this finishing stage, the molten polymer is held in a reactor (finisher) at 275° C. under an autogenous atmosphere regulated at 102 kPa. The residence time in the finisher is 30 minutes. At the outlet of the appliance, a gear pump makes it possible to withdraw the molten polymer and to feed a transfer pipe, thus making possible the transportation of the polymer up to the granulation device. The polymer flow rate is 1500 $kg \cdot h^{-1}$.

Extrusion, Granulation and Cooling of the Polymer

At the outlet of the transfer pipe, the molten polymer is extruded in the form of rods through a die comprising 28 holes (stage a)). The following successive operations are then carried out:

Transporting the rods over a guiding zone covered with a film of water (stage b)); this water is fed at a temperature of 22° C. via a lip located at the zone head and also via several distribution pipes equipped with spray nozzles located above the zone. The length travelled by the rods over the zone is 1.2 m.

Feeding the partially cooled rods into a cutting block (USG 300 type from Automatik Plastics Machinery) comprising a device for entraining the rods, providing a delivery rate for the rods of 114 $m \cdot min^{-1}$, and a device for cutting by means of a milling cutter and a counter-blade. The rods are cut in the cutting device (stage c)) and the resulting granules are entrained by the water.

Conveying the granules, as a mixture with water, in a pipe having a length equal to 2.1 m (continuation of stage b)); the passage time of the granules in this pipe is equal to approximately 3 s.

Separating the granules from the cooling water (stage d)) in an air-fed impact device which makes possible the conveying of the granules along a curvilinear channel at the same time as the elimination of the water through several screens (apparatus of GT 400/2 type from Automatik Plastics Machinery). The air used for this separation is ambient air withdrawn in the plant, at the temperature of 20° C. and at the flow rate of 2700 $m^3 \cdot h^{-1}$. The residence time of the granules in the separating device is between 1 and 2 s.

The total flow rate of cooling water used on the platform is 11 $m^3 \cdot h^{-1}$. The final temperature of the cooling water is 36° C.

The duration of the contact between the extruded material and the cooling liquid (stages b+c+d) is equal to 5 seconds.

The granules exiting from the separator feed a cooler of vibrating helical conveyor type (stage e)) (sold by Vibra Maschinenfabrik). This cooler comprises an upward helical path of 19 turns with an expanded length of 39 m, along an open profile of rectangular cross-section. The metal wall of this channel is cooled by means of cooling circuits of half-shell type, with respect to the external face of the channel; these circuits are fed with water at a temperature of 22° C. at the total flow rate of 2 $m^3 \cdot h^{-1}$. The outlet temperature of the cooling water is 36° C. The residence time of the granules in the cooler is 4 minutes. The granules exiting from the cooler are directly packaged in cardboard containers (octabin) lined with plastic bags. These containers, with a capacity of 1000 kg, are subsequently stored in the plant, after being closed.

The temperature and the moisture content of the granules are measured on several samples, withdrawn at the outlet of the separator (which corresponds to the inlet of the cooler) or at the outlet of the cooler. The results obtained are summarized in table 1.

Other characteristics (viscosity index, mean weight of granules and yellowness index) are measured on a sample, withdrawn at the cooler outlet. The yellowness index is also measured on a sample representative of the polyamide batch manufactured, withdrawn from a bag after storage for 48 h. The corresponding results are collated in table 2.

Example 5

Comparative

The characteristics of example 4 are repeated, apart from the difference that the vibrating helical conveyor is not here cooled by a water circuit. The only cooling of the granules observed is related to the heat exchanges by natural convection with the ambient air of the plant, during the journey of 4 minutes in the vibrating helical conveyor.

The granules exiting from the vibrating helical conveyor are directly packaged in cardboard containers (octabin) lined with plastic bags. These containers, with a capacity of 1000 kg, are subsequently stored in the plant, after being closed.

As in example 4, the duration of the contact between the extruded material and the cooling liquid (stages b+c+d) is equal to 5 seconds. Stage e) is suppressed here.

The temperature and the moisture content of the granules are measured on several samples, withdrawn at the outlet of the separator (which corresponds to the inlet of the cooler) or at the outlet of the cooler. The results obtained are summarized in table 1.

Other characteristics (viscosity index, mean weight of granules and yellowness index) are measured on a sample, withdrawn at the cooler outlet. The yellowness index is also measured on a sample representative of the polyamide batch manufactured, withdrawn from a bag after storage for 48 h. The corresponding results are collated in table 2.

TABLE 1

Temperature and moisture content measured on the granules at different points of the process

| Example | Temperature (° C.) | | Moisture content (% by weight) | |
|---|---|---|---|---|
| | Cooler inlet* | Cooler outlet* | Cooler inlet* | Cooler outlet* |
| 1 (invention) | 80 ± 2 | 27 ± 3 | 0.65 | 0.34 |
| 2 (invention) | 89 ± 5 | 29 ± 2 | 0.47 | 0.32 |
| 3 (comparative) | 38 ± 1** | — | 0.60 ± 0.15** | — |
| 4 (invention) | 100 ± 1 | 48 ± 1 | 0.36 | 0.24 |
| 5 (comparative) | 100 ± 1 | 77 ± 2 | 0.37 | 0.22 |

*In the case of comparative example 5, the efficiency of the cooling is poor; however, the term of cooler has been retained.

**This case concerns measurements carried out on the granules at the end of stage d) of water/granules separation, since the stage e) of cooling after separation is absent here.

TABLE 2

Characteristics of the final polymer

| Example | Viscosity index (ml · g$^{-1}$) | Mean weight of granules (g/100 granules) | Yellowness index (at the outlet of the cooler) | Yellowness index (polymer, after storage for 48 h) |
|---|---|---|---|---|
| 1 (invention) | 112 | 2.40 | −4.5 (in accordance) | −4 (in accordance) |
| 2 (invention) | 129 | 2.45 | −4 (in accordance) | −4 (in accordance) |
| 3 (comparative) | 128 | 2.50 | −4 (in accordance) | −3.5 (in accordance) |
| 4 (invention) | 129 | 2.35 | −3.5 (in accordance) | −3 (in accordance) |
| 5 (comparative) | 129 | 2.35 | −3.5 (in accordance) | +2 (not in accordance) |

On reading the results described in the examples, it is clearly apparent that the use of a stage e) of cooling the granules after the various stages a) to d) makes it possible, when the various stages are carried out under specified conditions of temperature and residence time, to achieve low moisture contents, within the desired range, without prejudice to the final quality of the polyamide.

Comparative example 3 demonstrates that an excessively long contact time between the water-comprising cooling liquid and the granules, while it makes it possible to avoid the cooling stage e), results in a much higher moisture content.

Comparative example 5 demonstrates that an inefficient cooling, which does not make it possible to achieve a final temperature within the desired range, results in an unacceptable detrimental change in the color of the polyamide granules (yellowing).

The invention claimed is:

1. A process for the preparation of polyamide granules, comprising the following steps:

a) extruding a polyamide in the molten state, b) cooling the extruded polyamide obtained in step a) by contact with a liquid that comprises water, c) cutting the extruded polyimide into granules, d) separating the liquid and the extruded polyamide, e) cooling the granules, separate from the liquid, until a mean temperature of the granules of less than or equal to 55° C. is achieved, wherein:

step a) is carried out through a die which is placed at the outlet of a polymerization reactor, so that the molten polymer present in the polymerization reactor is directly extruded, step c) is carried out during step b), after step b) and before step d), or after step d), the duration of the contact between the extruded polyamide and the liquid is less than or equal to 10 seconds, and the duration of step e) is less than or equal to 10 minutes, the polyamide granules obtained in step e) have a moisture content of between 0.1% and 0.4% by weight of water (with respect to the weight of granules).

2. The process as claimed in claim 1, wherein the cooling liquid is water.

3. The process as claimed in claim 1, wherein the mean temperature of the granules before step e) is between 60 and 150° C.

4. The process as claimed in claim 1, wherein step e) is carried out by treatment of the granules with a gas at a temperature of between 0 and 40° C.

5. The process as claimed in claim 4, wherein the gas of step e) is air.

6. The process as claimed in claim 4, wherein step e) is carried out using a fluidized bed.

7. The process as claimed in claim 4, wherein step e) is carried out using a conveyor equipped with a system for direct cooling by injection of air.

8. The process as claimed in claim 1, wherein step e) is carried out by bringing the granules into contact with a surface, the temperature of which is between 5 and 35° C.

9. The process as claimed in claim 8, wherein moisture exits from the granules during step e) and is eliminated by natural convection.

10. The process as claimed in claim 8 wherein step e) is carried out using a conveyor equipped with a system for indirect cooling by a jacket in which a cooling fluid circulates at a temperature of between 5 and 35° C.

11. The process as claimed in claim 1, wherein the process does not comprise a step of drying the polyamide granules in an inert gas environment.

12. The process as claimed in claim 1, wherein the polyamide granules obtained in step e) have a mean weight of between 1.0 and 5.0 g per 100 granules.

13. The process as claimed in claim 1, wherein the polyamide granules obtained in step e) have a mean weight of between 1.5 and 4.0 g per 100 granules.

14. A process for the preparation of polyamide granules, comprising the following steps:

a) extruding a polyamide in the molten state, b) cooling the extruded polyamide obtained in step a) by contact with a liquid that comprises water, c) cutting the extruded polyamide into granules, d) separating the liquid and granules, e) cooling the granules obtained in step d) by injecting air into a fluidized bed of the granules until a mean temperature of the granules of less than or equal to 55° is achieved, wherein step a) is carried out through a die which is placed at the outlet of a polymerization reactor, so that the molten polymer present in the polymerization reactor is directly extruded, wherein step e) is carried out during step b) or after step b) and before step d), and the duration of the contact between the extruded polyamide and the liquid is less than or equal to 10 seconds and the duration of step e) is less than or equal to 10 minutes, wherein the polyamide granules obtained step e) have a moisture content of between 0.1% and 0.4% by weight of water (with respect to the weight of granules).

15. A process for the preparation of polyamide granules, comprising the following steps:

a) extruding a polyamide in the molten state, b) cooling the extruded polyamide obtained in step a) by contact with a liquid that comprises water, c) cutting the extruded polyamide into granules, d) separating the liquid and granules, e) cooling the granules obtained in step d) by bringing the granules into contact with a cooled surface until a mean temperature of the granules of less than or equal to 55° is achieved, wherein step a) is carried out through a die which is placed at the outlet of a polymerization reactor, so that the molten polymer present in the polymerization reactor is directly extruded, wherein step c) is carried out during step b) or after step b) and before step d), and the duration of the contact between the extruded polyimide and the liquid is less than or equal to 10 seconds, and the duration of step e) is less than or equal to 10 minutes, wherein the polyamide granules obtained in step e) have a moisture content of between 0.1% and 0.4% by weight of water (with respect to the weight of granules).

* * * * *